(12) United States Patent
Park (10) Patent No.: US 12,025,089 B2
(45) Date of Patent: Jul. 2, 2024

(54) WAVE ENERGY CAPTURE SYSTEM

(71) Applicant: Jong Won Park, Busan (KR)

(72) Inventor: Jong Won Park, Busan (KR)

( * ) Notice: Subject to any disclaimer, the term of this patent is extended or adjusted under 35 U.S.C. 154(b) by 0 days.

(21) Appl. No.: 17/921,974

(22) PCT Filed: Aug. 2, 2021

(86) PCT No.: PCT/KR2021/010070
§ 371 (c)(1),
(2) Date: Oct. 28, 2022

(87) PCT Pub. No.: WO2022/030916
PCT Pub. Date: Feb. 10, 2022

(65) Prior Publication Data
US 2023/0175471 A1    Jun. 8, 2023

(30) Foreign Application Priority Data

Aug. 3, 2020  (KR) .......................... 10-2020-0096897

(51) Int. Cl.
*F03B 13/18*    (2006.01)
*F03B 11/00*    (2006.01)

(52) U.S. Cl.
CPC ............ *F03B 13/188* (2013.01); *F03B 11/00* (2013.01)

(58) Field of Classification Search
CPC .... F03B 13/188; F03B 11/00; F03B 13/1815; F03B 13/18; Y02E 10/20; Y02E 10/30
See application file for complete search history.

(56) References Cited

U.S. PATENT DOCUMENTS

| | | | |
|---|---|---|---|
| 4,612,768 A | 9/1986 | Thompson, Jr. | |
| 6,269,636 B1 * | 8/2001 | Hatzilakos | F03B 13/1815 290/43 |
| 7,444,810 B2 * | 11/2008 | Olson | F03B 13/1815 60/497 |
| 2002/0067043 A1 * | 6/2002 | Ovadia | F03B 13/1815 290/53 |
| 2008/0173115 A1 * | 7/2008 | Schulte-Tigges | F16H 33/02 74/25 |
| 2009/0322092 A1 * | 12/2009 | Werjefelt | F03B 13/20 290/53 |

(Continued)

FOREIGN PATENT DOCUMENTS

| | | | | |
|---|---|---|---|---|
| CA | 2839176 A1 * | 5/2013 | | F03B 13/1845 |
| KR | 10-2013-0031634 A | 3/2013 | | |

(Continued)

OTHER PUBLICATIONS

International Search Report for PCT/KR2021/010070 dated Nov. 25, 2021 from Korean Intellectual Property Office.
Office Action of GB2216659.9 dated Nov. 7, 2023.

*Primary Examiner* — Brian Christopher Delrue
(74) *Attorney, Agent, or Firm* — Revolution IP, PLLC (57) ABSTRACT

A wave energy capture system includes: a supporter frame fixed on the ground or the sea; a lever boom coupled to the supporter frame by a pivot; an energy-capturing member connected to one end of the lever boom to capture wave energy from the sea; a position control member connected to the other end of the lever boom to control the position of the lever boom; and an energy conversion member connected to the lever boom to convert vertical movement of the lever boom into power.

5 Claims, 11 Drawing Sheets

(56) References Cited

U.S. PATENT DOCUMENTS

| | | | | |
|---|---|---|---|---|
| 2011/0304145 A1* | 12/2011 | Raisch | ............... | F03B 13/1865 |
| | | | | 60/497 |
| 2012/0104761 A1* | 5/2012 | Vamvas | .................. | F03B 13/10 |
| | | | | 290/53 |
| 2012/0119624 A1* | 5/2012 | Vamvas | .................... | H02N 2/18 |
| | | | | 310/339 |
| 2015/0275848 A1* | 10/2015 | Patel | ................... | F03B 13/1815 |
| | | | | 290/53 |
| 2018/0187644 A1* | 7/2018 | Sung | ....................... | F03B 13/18 |

FOREIGN PATENT DOCUMENTS

| | | |
|---|---|---|
| KR | 10-2017-0000566 A | 1/2017 |
| KR | 10-2020-0062714 A | 6/2020 |

\* cited by examiner

WAVE ENERGY CAPTURE SYSTEM

TECHNICAL FIELD

The present invention relates to a wave energy capturing system that captures wave energy at a high efficiency, amplifies the captured energy, and converts the amplified energy into required power.

BACKGROUND ART

Methods using wave energy can be used continuously for 24 hours, thus can obtain relatively high production efficiency as compared to methods using wind power or solar light, and have an advantage of being easy to install and maintain.

However, a method of capturing energy generated from an up and down movement of waves using a floating body as a wave energy capturing member and floating the wave energy capturing member at sea level cannot cope with the ever-changing wave height and water level, has a problem in that capturing efficiency is low so that it does not have economic efficiency, and has difficulties in responding to disasters such as tsunamis or the like and in maintenance.

DISCLOSURE

Technical Problem

The present invention is directed to solving the above problems and providing a wave energy capturing system in which an energy capturing member that captures hydraulic pressure, a suction force, gravity (potential energy), and an inertia force from flowing waves is used for capturing wave energy at a high efficiency, and a lever boom amplifies the captured wave energy to drive an energy conversion member so that power with high economic efficiency is captured. Further, the present invention is also directed to providing a wave energy capturing system in which a position control member that captures energy in an efficient way by easily responding to the size of waves and changes in sea level and controls the operation of the system is provided to facilitate maintenance and management of bad weather.

Technical Solution

One aspect of the present invention provides a wave energy capturing system including:
  a supporter frame fixed on the ground or at sea;
  a lever boom coupled to the supporter frame by a pivot;
  an energy capturing member connected to one end of the lever boom to capture wave energy;
  a position control member connected to the other end of the lever boom to control a position of the lever boom so that the lever boom returns to a set position in response to an external traction force; and
  an energy conversion member connected to the lever boom to convert a vertical movement of the lever boom into power,
  wherein the lever boom includes a front boom at a side connected to the energy capturing member and a rear boom at a side connected to the energy conversion member with respect to the pivot, and is formed to have a leverage structure in which a length of the front boom is greater than a length of the rear boom,
  and the position control member is an elastic body connecting an end portion of the rear boom to a bottom surface.

The energy capturing member may be a planar diaphragm that is connected to the one end of the lever boom and blocks a flow of the waves,
  and the diaphragm may have an end portion at a sea side fixed to the seabed and an end portion at another side to which a membrane frame is coupled, wherein the membrane frame is connected to an end portion of the front boom through a traction wire.

The wave energy capturing system may further include a hopper unit coupled to an upper end of the diaphragm.

A mast may be coupled to an upper portion of the lever boom to be perpendicular to the lever boom, and an upper end of the mast may be connected to each of an end portion of the front boom and the end portion of the rear boom through a tension dispersing wire.

The energy conversion member may be connected to the rear boom to receive the vertical movement of the rear boom and convert the received vertical movement into required power.

The wave energy capturing system may further include a winch installed on an end portion of the front boom,
  wherein the energy capturing member may be connected to the front boom through a traction wire whose length is adjusted by the winch.

The wave energy capturing system may further include a traction wire guide which is installed on an end portion of the front boom and has a turning circumference about the pivot,
  wherein the energy capturing member may be connected to the front boom through a traction wire disposed along the traction wire guide.

The energy capturing member may be a reverse hopper type energy capturing device of which an upper portion and a side portion are sealed, a lower portion is open, and a planar area of the lower portion is wider than a planar area of the upper portion.

The energy conversion member may be a cylinder including a check valve therein to receive a vertical swing movement of the lever boom and generate power by compressing a power conversion medium.

The front boom may further include a deployable articulated boom.

Another aspect of the present invention provides a wave energy capturing system including:
  a supporter frame fixed on the ground or at sea;
  a lever boom coupled to the supporter frame by a pivot;
  an energy capturing member connected to one end of the lever boom to capture wave energy from the sea;
  a position control member connected to the other end of the lever boom to control a position of the lever boom; and
  an energy conversion member connected to the lever boom to convert a
  vertical movement of the lever boom into a rotational movement,
  wherein the lever boom includes a front boom at a side connected to the energy capturing member and a rear boom at a side connected to the energy conversion member with respect to the pivot, and is formed to have a leverage structure in which a length of the front boom is greater than a length of the rear boom,
  and the energy conversion member is configured as a power conversion drum, wherein the power conversion drum is mounted on the supporter frame, a pulley is mounted on a bottom surface of the rear boom, and a driving wire that drives the power conversion drum is fixed to a bottom of the energy conversion member after passing through the power conversion drum and the pulley.

Still another aspect of the present invention provides a wave energy capturing system including:

a supporter frame fixed on the ground or at sea;

a lever boom coupled to the supporter frame by a pivot;

an energy capturing member connected to one end of the lever boom to capture wave energy from the sea;

a position control member connected to the other end of the lever boom to control a position of the lever boom; and an energy conversion member connected to the lever boom to convert a linear movement of the lever boom into a rotational movement, wherein the lever boom includes a front boom at a side connected to the energy capturing member and a rear boom at a side connected to the energy conversion member with respect to the pivot, and is formed to have a leverage structure in which a length of the front boom is greater than a length of the rear boom, and a T-shaped boom is formed by coupling a boom to an end portion of the front boom to be perpendicular to the front boom, traction wires are each connected to both ends of the T-shaped boom, and both end portions of the energy capturing member having a long horizontal length are connected to the two traction wires.

Yet another aspect of the present invention provides a wave energy capturing system including:

a supporter frame fixed on the ground or at sea;

a lever boom coupled to the supporter frame by a pivot;

an energy capturing member connected to one end of the lever boom to capture wave energy from the sea;

a position control member connected to the other end of the lever boom to control a position of the lever boom; and an energy conversion member connected to the lever boom to convert a linear movement of the lever boom into a rotational movement, wherein the lever boom includes a front boom at a side connected to the energy capturing member and a rear boom at a side connected to the energy conversion member with respect to the pivot, and is formed to have a leverage structure in which a length of the front boom is greater than a length of the rear boom, the wave energy capturing system further includes a frame which is mounted on the seabed and on which the energy capturing member is mounted therein, and the mounting frame has a frame pulley installed on an upper end thereof, a fixed pulley is installed on a lower portion perpendicular to an end portion of the front boom, and a traction wire that pulls the energy capturing member is connected to the front boom after passing through the energy capturing member, the frame pulley, and the fixed pulley sequentially.

The energy capturing member may include a hollow tank having an air chamber therein that adjusts specific gravity so that an upper portion thereof can be positioned on the water surface.

Advantageous Effects

As described above, according to embodiments of the present invention, a wave energy capturing system in which an energy capturing member is configured to capture energy such as hydraulic pressure, a suction force, potential energy, and an inertia force of sea level and can capture energy at a high efficiency, and a lever boom amplifies the captured energy with a leverage effect to drive an energy conversion member so that power with high economic efficiency is captured can be provided, wherein the wave energy capturing system can respond appropriately to changes in sea level due to wave height and tidal waves, enable installation on the shore, and facilitate installation and maintenance by simple position control of the lever boom.

MODES OF THE INVENTION

Configurations and features of the present invention, and methods of achieving the same will be described with reference to embodiments and the accompanying drawing.

In this specification, embodiments are provided in order to fully explain the present invention and fully explain the scope of the present invention for those skilled in the art. The scope of the present invention should be defined by the appended claims. In addition, like reference numerals indicate like components throughout the specification, and terms described in this specification are for the purpose of describing the embodiments and are not limiting. In this specification, the singular forms include the plural forms unless the context clearly indicates otherwise. It will be understood that the terms "comprise" and/or "comprising" when used herein, specify some stated components and operations, but do not preclude the presence or addition of one or more other components and operations.

Hereinafter, exemplary embodiments of the present invention will be described with reference to the accompanying drawings.

A wave energy capturing system according to an embodiment of the present invention includes a supporter frame 10 fixed on the ground or at sea, a lever boom 30 coupled to an upper end of the supporter frame 10 by a pivot and having a leverage structure, an energy capturing member 50 connected to one end of the lever boom 30 to capture wave energy, a connecting member 40 that connects the lever boom 30 to the energy capturing member 50, an energy conversion member 70 connected to the lever boom 30 to convert a vertical linear movement of the lever boom 30 into power, and position control member 80 connected to the other end of the lever boom 30 to control a position of the lever boom 30. The lever boom 30 includes a front boom 31 at a side connected to the energy capturing member 50 and a rear boom 32 at the other side thereof with respect to a pivot 33. The lever boom 30 is configured to have a leverage structure in which a length of the front boom 31 is greater than a length of the rear boom 32. The energy conversion member 70 is connected to the rear boom 32 to convert a vertical linear movement of the rear boom 32 into power. That is, when the energy capturing member 50 moves with the movement of the waves, the lever boom 30 moves, and when the lever boom 30 moves, the position control member 80 and the energy conversion member 70 which are connected to the rear boom 32 are simultaneously pulled, the tension of the position control member 80 increases, the energy conversion member 70 is driven, and thus power energy is generated. The position control member 80 may be made of an elastic body having a restoring property when tensioned. The position control member 80 may further include a function for adjusting an elastic force. The position control member 80 that can adjust an elastic force are connected to one end of the rear boom 32 and a fixture on the ground to limit the lever boom 30 to be easily positioned within a set range according to wave height and water level change.

Figure 1:
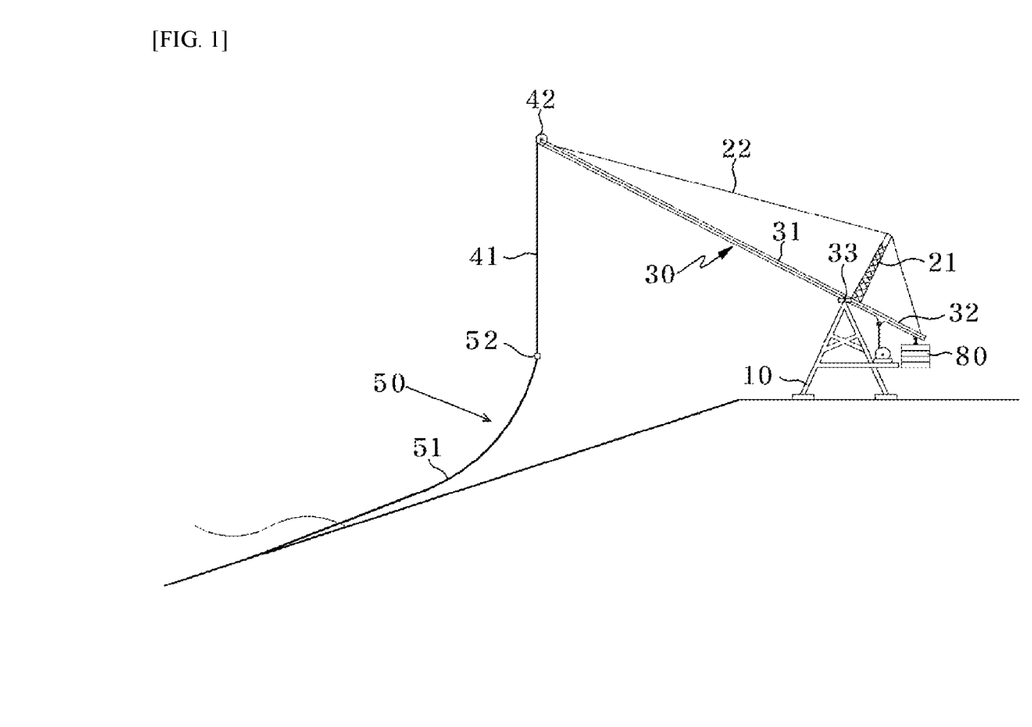
FIGS. 1 and 2 are diagrams illustrating a wave energy capturing system according to a first embodiment of the present invention.
Figure 2:
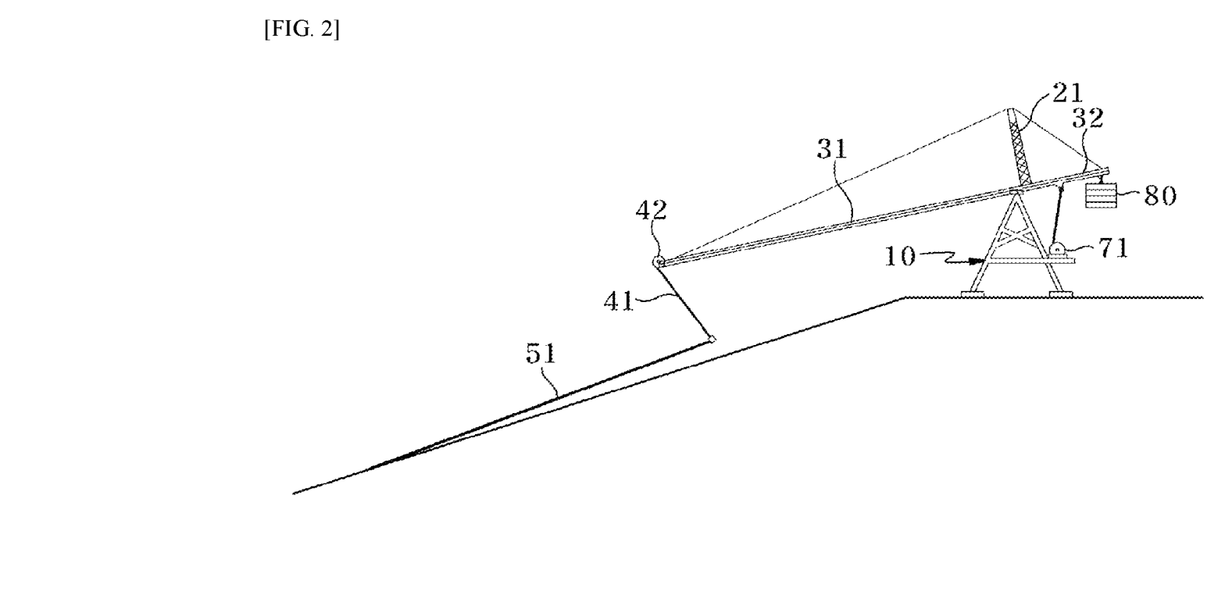

FIGS. 1 and 2 are diagrams illustrating a wave energy capturing system according to a first embodiment of the present invention. As illustrated in FIGS. 1 and 2, the wave energy capturing system according to the first embodiment includes a supporter frame 10, a lever boom 30 coupled to the supporter frame 10 by a pivot, an energy capturing member 50, a connecting member 40, an energy conversion member 70, and position control member 80, wherein a diaphragm 51 is applied as the energy capturing member 50.

In the wave energy capturing system according to the first embodiment of the present invention, the diaphragm 51 is used as the energy capturing member 50 connected to one end of the lever boom 30 to capture energy from the sea. In the diaphragm 51, when the water surface of the sea is in a flow movement of moving up and down and toward the shore where the waves break, a flat body is disposed on a slope from the bottom to the top to block the flow of waves and receive hydrodynamic pressure energy from the collision. The diaphragm 51 may be formed in a planar shape. The diaphragm 51 is formed of a flexible net, a cloth tent, a plastic film, or a metal plate, a membrane frame 52 is coupled to the diaphragm 51 to cross an upper end thereof, one end of a traction wire 41, which is the connecting member 40, is coupled to the membrane frame 52, and the other end of the traction wire 41 is coupled to one end of the front boom 31. One or more traction wires 41 may be coupled according to a width of the diaphragm 51. Energy is captured while the diaphragm 51 blocks the flow of the waves, and the captured energy is transmitted to the energy conversion member 70 through the lever boom 30 having a leverage structure. The diaphragm 51 has an end portion at a sea side fixed to the seabed and an end portion at another side coupled to the membrane frame 52, and the membrane frame 52 may be connected to an end portion of the front boom 31 through the traction wire 41. When the diaphragm 51 is fixed to the seabed, the stability is improved, and the resistance of the diaphragm to the movement of the sea is increased, and thus energy capturing power is increased. The diaphragm 51 is formed in a hopper structure to contain more flowing seawater, and thus energy capturing power may be improved. In a region where there is a large difference between the tides, energy is captured without being affected by the tide by installing a plurality of diaphragms 51 in parallel between the shoreline change distance according to high tide and low tide.

In the wave energy capturing system according to the first embodiment of the present invention, the lever boom 30 has a leverage structure in which the front boom 31 at a side to which the energy capturing member 50 is connected is formed longer than the rear boom 32 at a side to which the energy conversion member 70 is connected in order to increase a leverage effect. A winch 42 is installed at the end portion of the front boom 31, the traction wire 41 is coupled to the front boom 31 by the winch 42, and a length of the traction wire 41 may be adjusted through the winch 42 in response to the wave height and water level change. In an event of a disaster such as a typhoon or the like, it is possible to prevent the wave energy capturing system from being damaged by the typhoon by releasing the winch 42 so that the diaphragm 51 is submerged in the sea or separated. The winch 42 may be installed to be adjustable in a wired or wireless manner.

A mast 21 may be formed on an upper surface of the lever boom 30 to be perpendicular to the lever boom 30, and an upper end of the mast 21 may be connected to each of the end portion of the front boom 31 and the end portion of the rear boom 32 through a jib tie 22, which is a wire for dispersing tension. The mast 21 and one pair of jib ties 22 disperse the tension of the front boom 31 and the rear boom 32, and thus the stability of the lever boom 30 is improved.

The energy conversion member 70 is connected to the rear boom 32 to convert a vertical swing movement of the rear boom 32 with respect to the pivot 33 into a rotational movement. The energy conversion member 70 of the wave energy capturing system according to the first embodiment may be implemented to have a driving wire 72 for connecting the energy conversion member 70 to the rear boom 32, and a power conversion drum 71. The power conversion drum 71 converts a vertical linear movement of the rear boom 32 into a rotational movement. The power conversion drum 71 may be implemented as a rack gear (not illustrated) or a hydraulic/pneumatic cylinder 74. The energy conversion member 70 may include a transmission and a generator to generate electricity at an optimal rotation ratio.

By installing the position control member 80 on the end portion of the rear boom 32, when there is no traction force of the energy capturing member 50, the front boom 31 may be maintained at an angle greater than or equal to a set horizontal level.

When wave power is applied to the energy capturing member 50, the front boom 31 and the position control member 80 are pulled, and in this case, the front boom 31 is lowered, and when a traction force of the wave power is lost, the front boom 31 is moved to a set position by the elastic force of the position control member 80. As the position control member 80 according to the first embodiment, an elastic wire, a spring wire, or the like may be used.

FIG. 2 is a diagram illustrating a state in which the wave energy capturing system according to the first embodiment is driven. As illustrated in FIG. 2, when waves are pushed toward the diaphragm 51 of the wave energy capturing system, the diaphragm 51 is laid on the seabed and pulls the traction wire 41, and accordingly, the front boom 31 moves downward, the rear boom 32 is lifted upward, the position control member 80 and the driving wire 72 are pulled so that the tension of the position control member 80 is increased, and the power conversion drum 71 is driven. A movement in which the diaphragm 51 lays down and stands up according to the movement of the continuous waves is repeated, and accordingly, the lever boom 30 performs a seesaw movement with respect to the pivot 33, and the pulling and releasing of the driving wire 72 are repeated so that the power conversion drum 71 is continuously driven. The power conversion drum 71 may be installed on the supporter frame 10. Therefore, the lever boom 30 of the present invention enhances the traction force of the energy capturing member 50 by a leverage effect at a ratio of the lengths of the front boom 31 and the rear boom 32 according to the law of levers so that the power conversion drum 71 is driven through the driving wire 72. When the enhancement is based on the law of levers, a position of the front boom 31 pulled by the traction wire 41 becomes an input force, the pivot 33 becomes a fulcrum, and a position of the power conversion drum 71 becomes a load. For example, when a distance between a point at which the lever boom 30 and the traction wire 41 are connected and the pivot 33 is 6 meters and a distance between the pivot 33 and a point at which the driving wire 72 is connected is 2 meters, the energy capturing member 50 pulls the driving wire 72 with a force that is tripled by the leverage effect of the energy pulling the lever boom 30 to drive the power conversion drum 71.

Figure 3:
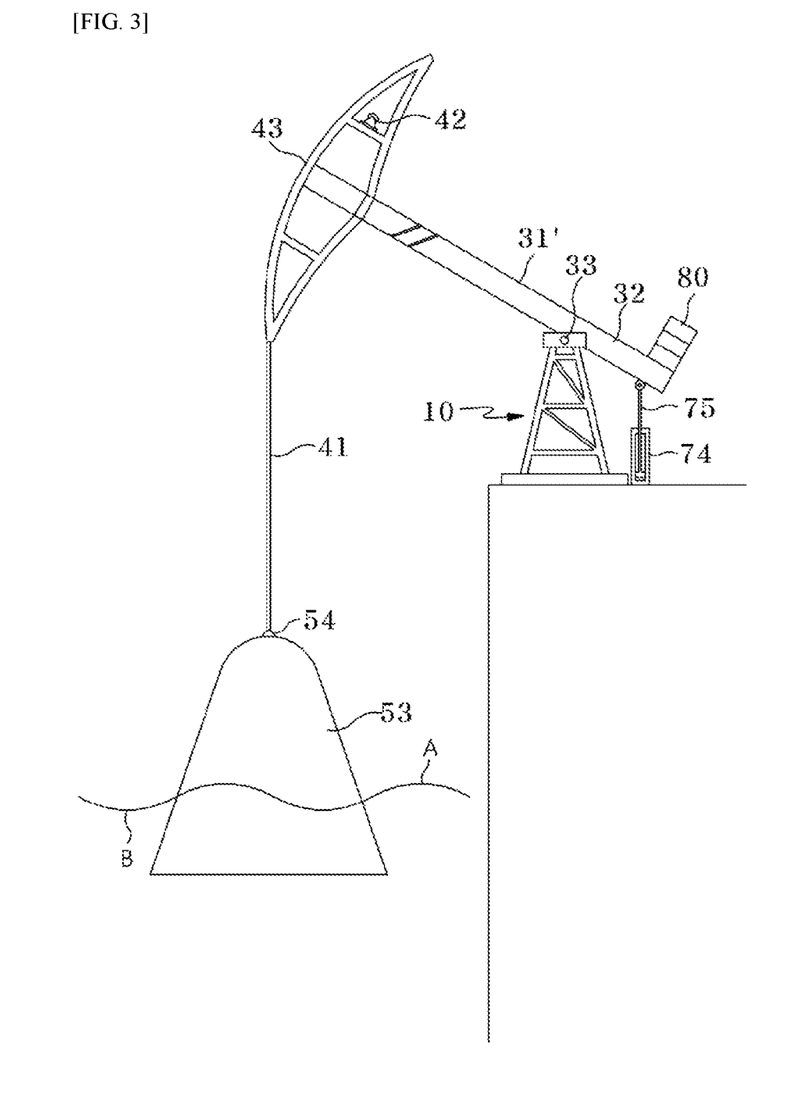
FIG. 3 is a diagram illustrating a wave energy capturing system according to a second embodiment of the present invention.

FIG. 3 is a diagram illustrating a wave energy capturing system according to a second embodiment of the present invention. Description of the same components as those of the first embodiment will be omitted. As illustrated in FIG. 3, in the wave energy capturing system according to the second embodiment, a traction wire guide 43 is installed at an end portion of a front boom 31, a winch 42 is disposed on a traction wire guide 43 and is disposed along the traction wire guide and connected to an energy capturing member 50, and a length of the traction wire guide 43 is adjusted by the winch 42. A traction wire 41 is stably connected to the energy capturing member 50 at an end portion of the front boom 31 by the traction wire guide 43, and may stably pull the energy capturing member 50 even when pulling the energy capturing member 50. The traction wire guide 43 may be configured to have a turning circumference about a pivot 33.

In the wave energy capturing system according to the second embodiment, a reverse hopper type energy capturing device 53 is applied as the energy capturing member 50. The reverse hopper type energy capturing device 53 has a structure in which upper and side portions are sealed, a lower portion is open, and a planar area of the lower portion is greater than a planar area of the upper portion. Reinforcing members or partitions that support structures are provided in an inside of the reverse hopper type energy capturing device 53 so that the inside of the reverse hopper type energy capturing device 53 is fully filled with the seawater due to the flooding. A height of the side portion may be greater than the height of waves in the installation region in order to prevent the inflow of air due to the flow of sea level, and the upper portion of the reverse hopper type energy capturing device 53 is pulled by the traction wire 41 through a bracket and is positioned at a wave crest A. When the water surface is lowered by the waves, the inside of the reverse hopper type energy capturing device 53 becomes a vacuum to generate a suction force and potential energy and pull the lever boom 30 through the traction wire.

In the wave energy capturing system according to the second embodiment, a cylinder 74 is applied as an energy conversion member 70. The cylinder 74 including a check valve (not illustrated) therein receives a vertical swing movement of a rear boom 32 and compress hydraulic oil, water, and air, which are power conversion media, to generate power. In this case, the cylinder 74 may be a cylinder having a spring therein. Further, a hopper having an open upper portion may be used in the same way as the cylinder 74.

Figure 4:
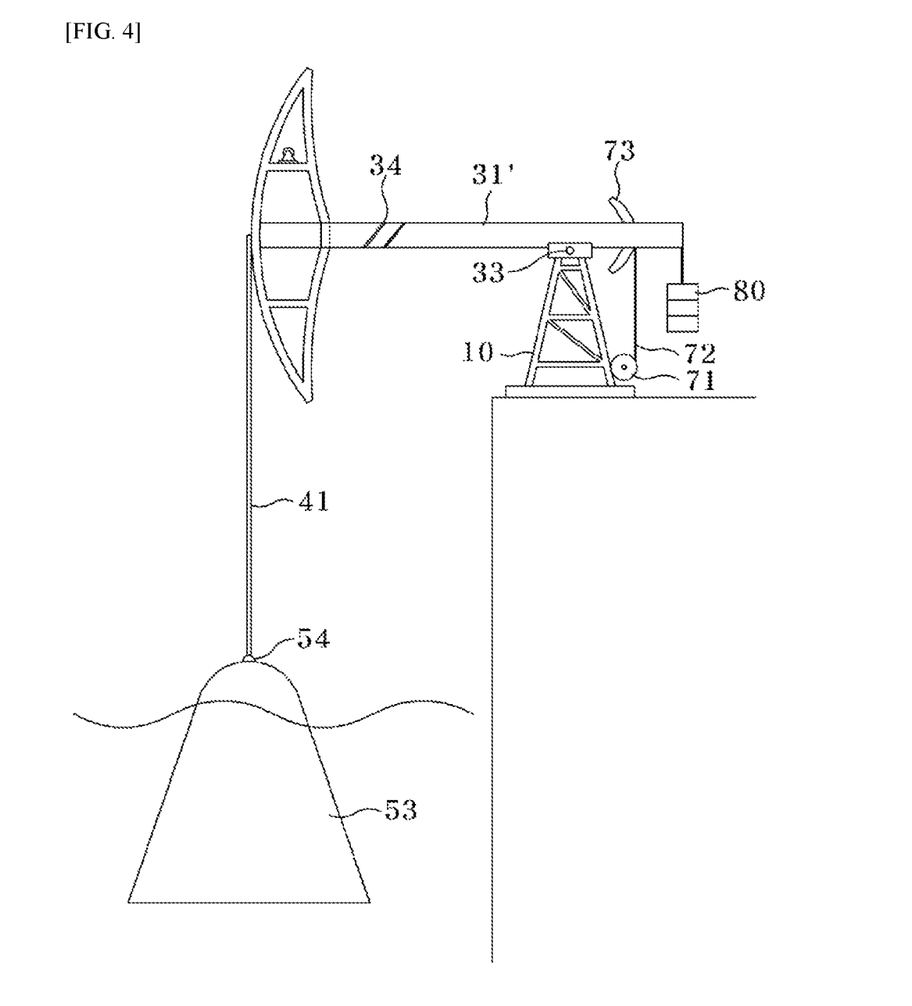
FIG. 4 is a diagram illustrating a wave energy capturing system according to a third embodiment of the present.

FIG. 4 illustrates a wave energy capturing system according to a third embodiment of the present. Description of the same components as those of the first and second embodiments will be omitted. In the wave energy capturing system according to the third embodiment, a driving wire 72 is provided in a driving wire guide 73 that pulls and drives a power conversion drum 71 so that an effect of lengthening a driving length can be obtained. For example, a roller chain may be provided as the driving wire 72 and may be provided as the power conversion drum 71. Further, a front boom 31 may further include a deployable articulated boom 34. When it is difficult to capture energy economically due to low wave energy at sea level, the articulated boom 34 of the front boom 31 is deployed to extend a length of the front boom 31 to increase a leverage effect, and thus it is possible to capture energy economically. The articulated boom 34 may be expanded and contracted using a wire, a chain, a linear gear, a hydraulic cylinder, etc. operated by a motor.

Figure 5:
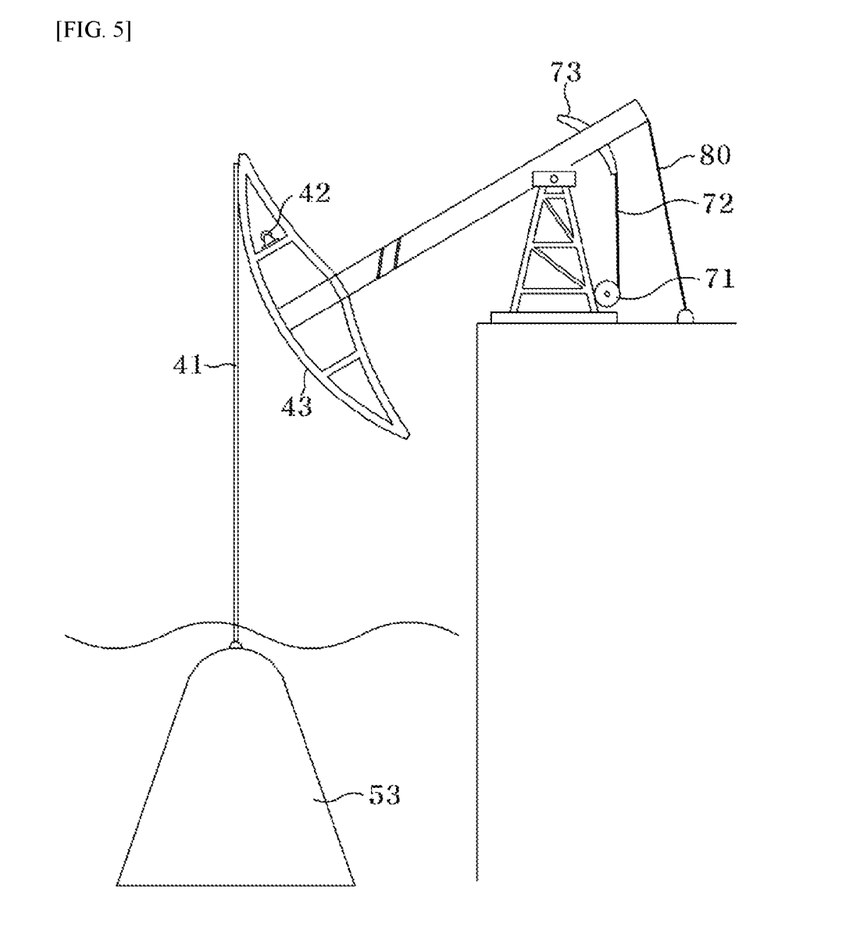
FIG. 5 is a diagram illustrating a wave energy capturing system according to a fourth embodiment of the present invention.

FIG. 5 illustrates a wave energy capturing system according to a fourth embodiment of the present invention. Description of the same components as those of the first to third embodiments will be omitted. The wave energy capturing system according to the fourth embodiment includes a position control member 80. The position control member 80 may further include a component that can adjust tension, such as a roller drum having a spring, a sheave, a hydraulic spring, and a hydraulic cylinder, as an elastic member that connects an end portion of the rear boom 32 to the ground. The position control member 80 acts to set a position of a lever boom 30 by tension and to always return to the set position in response to an external traction force, and in the event of a disaster such as a tsunami or in maintenance, the position control member 80 releases the tension so that the front boom 31 is moved down to the ground to separate the energy capturing member 50 and not be affected by the waves, and thus it can be dealt with easily.

Further, the wave energy capturing system according to the fourth embodiment may further include a winch 42 for controlling a traction wire. By providing the winch 42 that adjusts the height and position of the energy capturing member 50, it is possible to easily respond to a change in sea level due to tides and a tsunami caused by bad weather. A traction wire 41 is wound around the winch 42 mounted on a traction wire guide 43 of which one side is connected to the energy capturing member 50 and the other side is installed on the front boom 31. By winding or unwinding the traction wire 41 around the winch 42, the height and position of the energy capturing member 50 are changed according to the change in the water level, and thus energy may be captured without being affected by the wave height or water level change. Further, in the case in which a tsunami occurs due to bad weather, when the traction wire 41 is unwound and the energy capturing member 50 is lowered to the seabed, the wave energy capturing system does not perform any operation.

Figure 6:
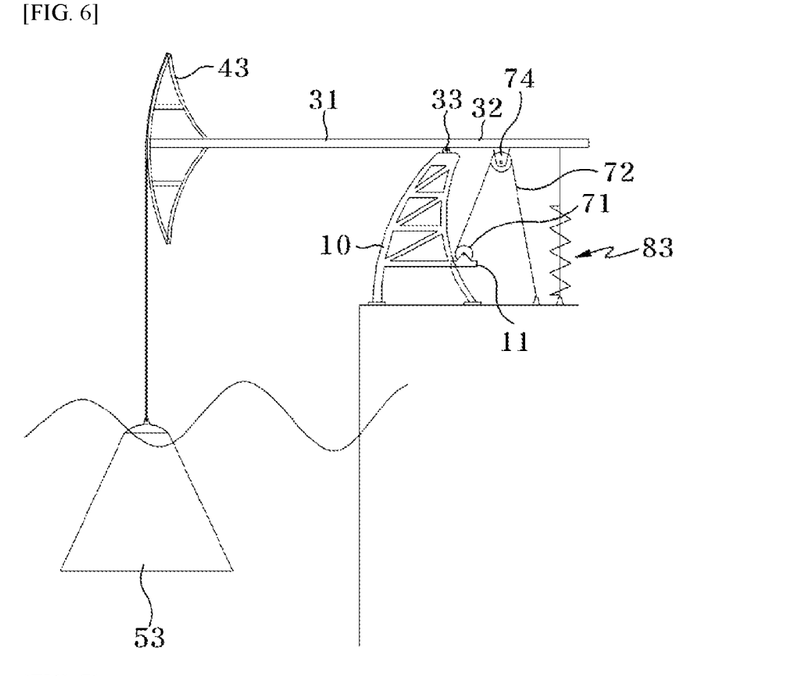
FIG. 6 is a diagram illustrating a wave energy capturing system according to a fifth embodiment of the present invention.

FIG. 6 illustrates a wave energy capturing system according to a fifth embodiment. Description of the same components as those of the first to fourth embodiments will be omitted. In the wave energy capturing system according to the fifth embodiment, a power conversion drum 71 is applied as an energy conversion member 70, the power conversion drum 71 is mounted on a supporter frame 10, and a pulley 74 is mounted on a bottom surface of a rear boom 32. A driving wire 72 is fixed to the ground after passing through the power conversion drum 71 and the pulley 74. It is possible to increase a driving distance of the driving wire 72 that operates the power conversion drum 71 using the pulley. When the rear boom 32 is lifted by the traction of the energy capturing member 50, the pulley 74 pulls the driving wire 72 so that the rear boom 32 may be driven by pulling the power conversion drum 71 with a length twice the movement distance. In this case, although the driving distance may be further increased by providing one or more pulleys 74, an increase in energy may be lowered as the driving distance is increased. In the wave energy capturing system according to the fifth embodiment, a spring wire 83 may be applied as a position control member 80. The spring wire 83 may be made of an elastic member such as a tension spring, a reel spring, and an elastic rubber, and may have one side fixed to an end portion of the rear boom 32 and the other side fixed to the ground or other fixtures and is pulled by a swing movement of the rear boom 32 to extend and accumulate tension. When traction force is lost, the spring wire 83 pulls the rear boom 32 with the accumulated tension. The spring wire 83 may include a device, such as a roller drum having a spring, a sheave, and a hydraulic cylinder to adjust the tension.

Figure 7:
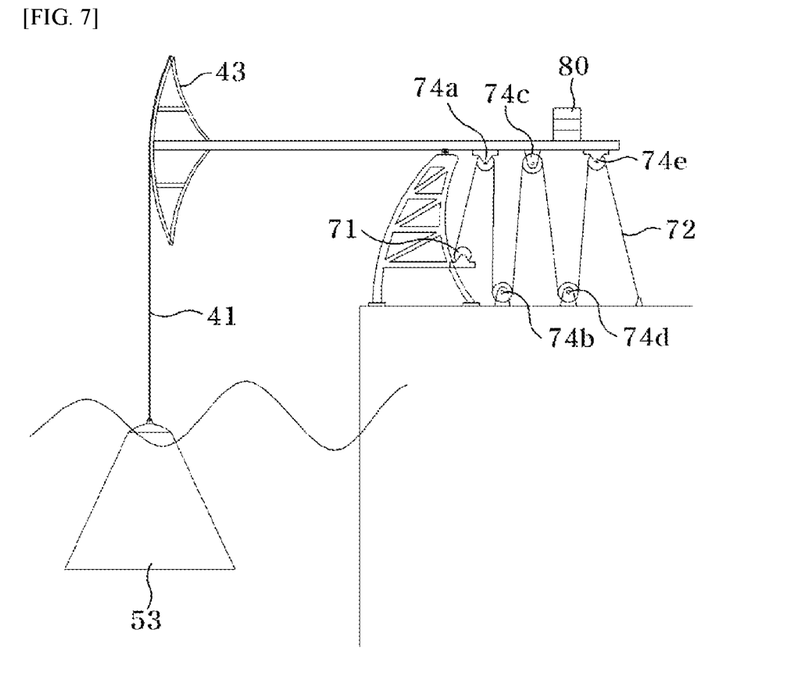
FIG. 7 is a diagram illustrating a wave energy capturing system according to a sixth embodiment of the present invention.

FIG. 7 illustrates a wave energy capturing system according to a sixth embodiment. Description of the same components as those of the first to fifth embodiments will be omitted. In the wave energy capturing system according to the sixth embodiment, a power conversion drum 71 is applied as an energy conversion member 70, the power conversion drum 71 is mounted on a supporter frame 10, a plurality of pulleys 74a, 74c, and 74e are mounted on a bottom surface of a rear boom 32, and pulleys 74b and 74c are mounted on the ground to correspond to the pulleys 74a, 74c, and 74e. A driving wire 72 is fixed to the ground after passing through the power conversion drum 71 and the pulleys 74a, 74b, 74c, 74d, and 74e sequentially. A driving distance of the driving wire 72 that operates the power conversion drum 71 using the pulleys 74a, 74b, 74c, 74d, and 74e may be increased.

Figure 8:
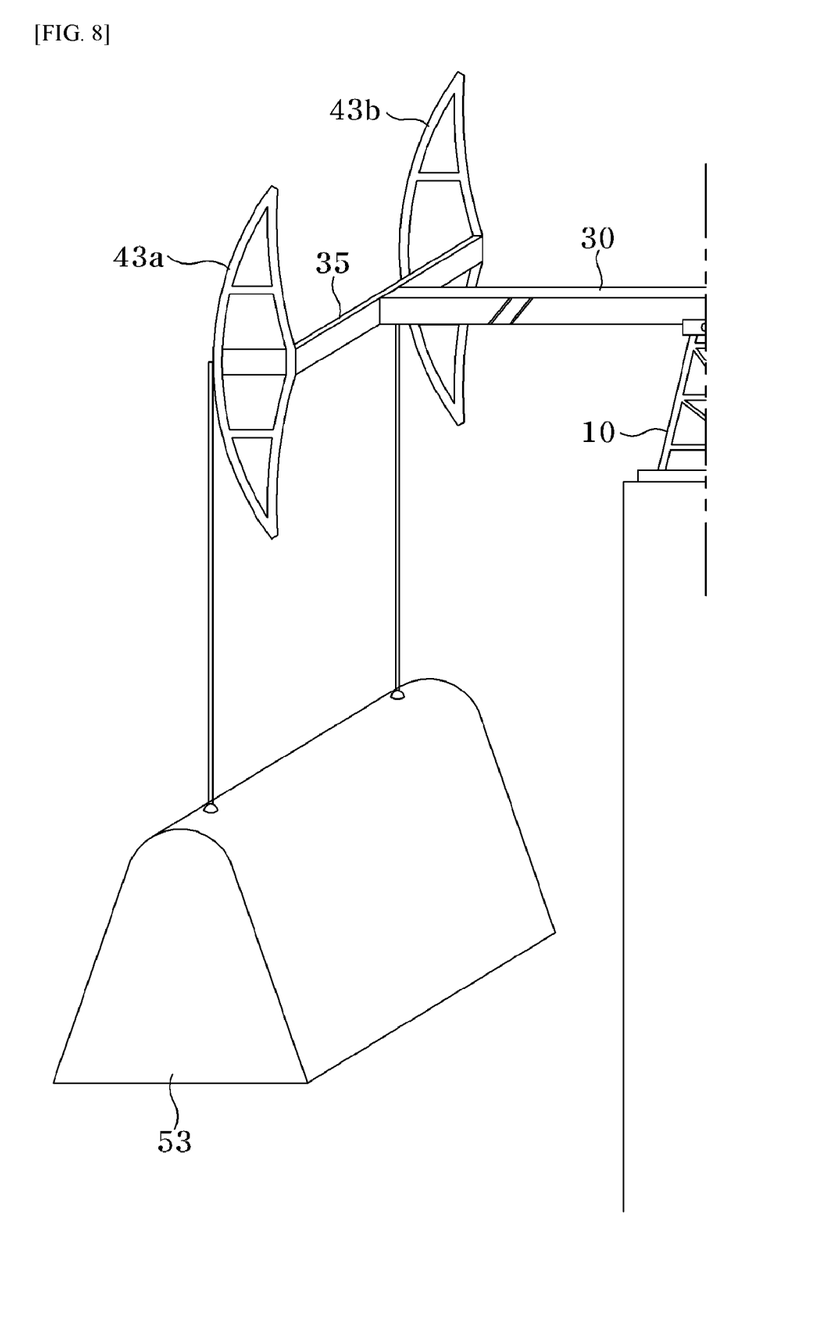
FIG. 8 is a diagram illustrating a wave energy capturing system according to a seventh embodiment of the present invention.

FIG. 8 is a diagram illustrating a wave energy capturing system according to a seventh embodiment of the present invention. Description of the same components as those of the first to sixth embodiments will be omitted. In the wave energy capturing system according to the seventh embodiment, a T-shaped boom 35 is applied. In the case in which an energy capturing member 53 has a long horizontal length, the T-shaped boom 35 may be formed by coupling a boom perpendicular to a front boom 31 to an end portion of the front boom 31, traction wires 41 may each be connected to both ends of the T-shaped boom 35, and the energy capturing member 53 having the long horizontal length may be fixed with the two traction wires 41 and thus the energy capturing member 53 may be stably pulled. Traction wire guides 43a and 43b are each coupled to both ends of the T-shaped boom 35.

Figure 9:
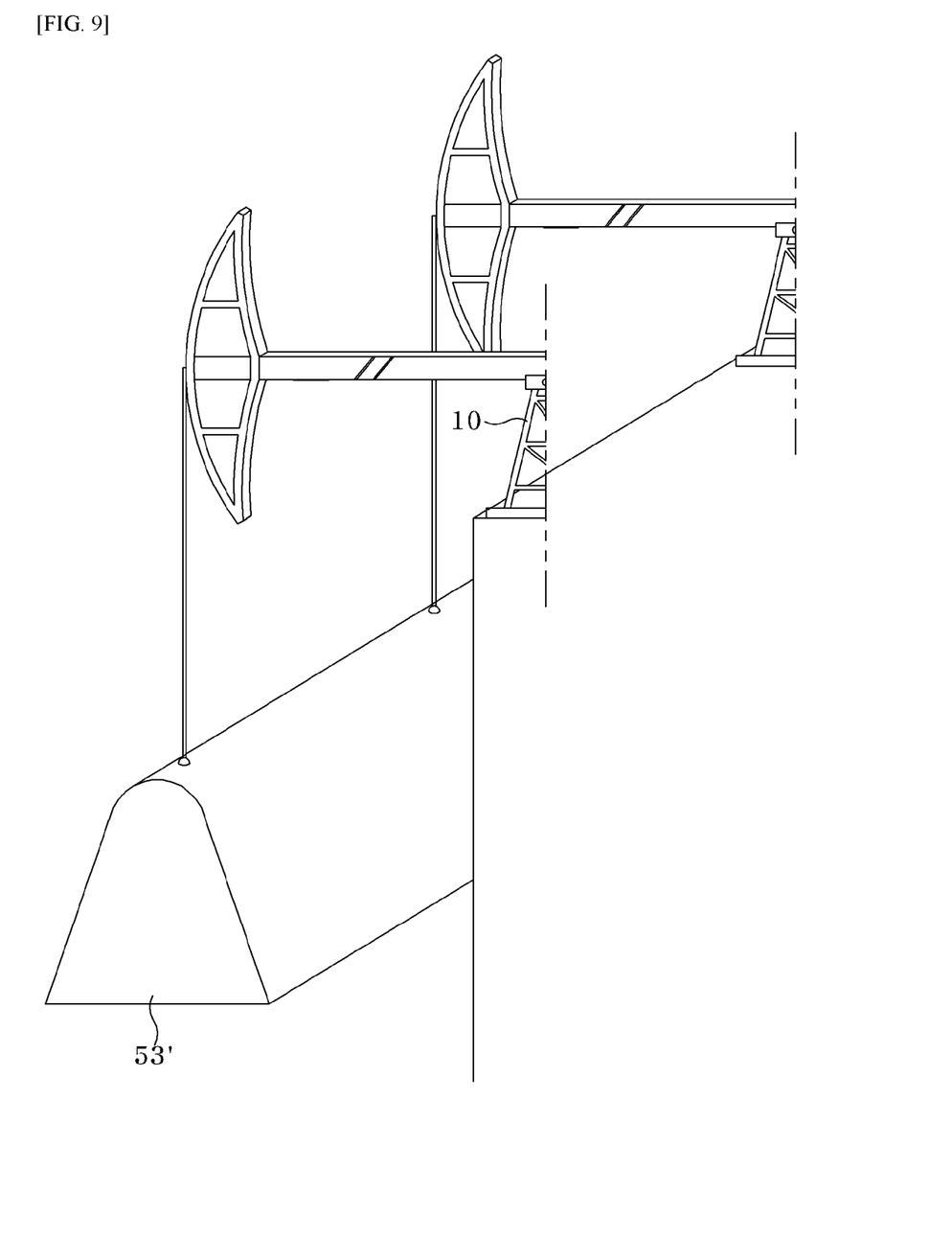
FIG. 9 is a diagram illustrating a wave energy capturing system according to an eighth embodiment of the present invention.

FIG. 9 is a diagram illustrating a wave energy capturing system according to an eighth embodiment of the present invention, and an energy capturing member 53' having a long horizontal length is applied. Two wave energy capturing systems may be installed in parallel, and each traction wire may be connected to the energy capturing member 53' having a long horizontal length to drive a pair of energy conversion members 70 of a pair of wave energy capturing systems.

Figure 10:
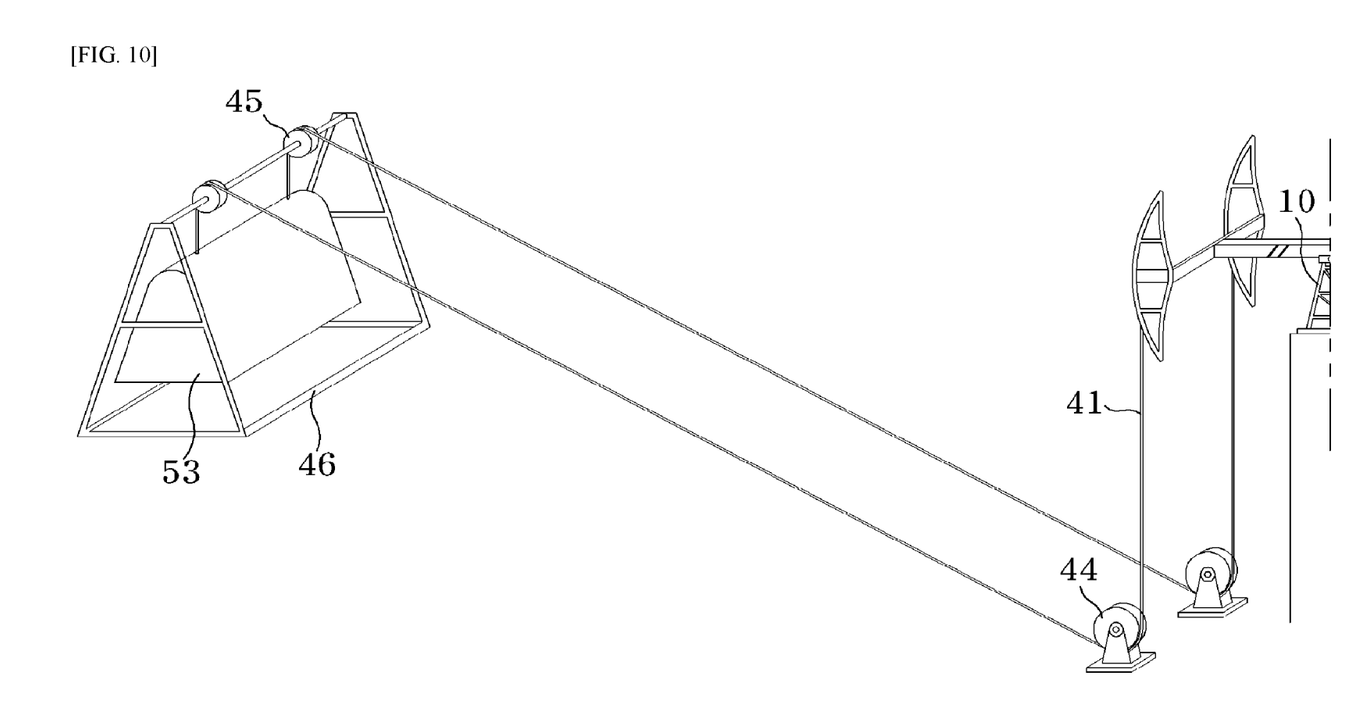
FIG. 10 is a diagram illustrating a wave energy capturing system according to a ninth embodiment of the present invention.

FIG. 10 is a diagram illustrating a wave energy capturing system according to a ninth embodiment of the present invention. The wave energy capturing system according to the ninth embodiment further includes a mounting frame 46 for mounting an energy capturing member 50 installed on the seabed. The mounting frame 46 includes frame pulleys 45 installed at an upper end thereof, and further includes fixed pulleys 44 installed below an end portion of the front boom 31 to be perpendicular thereto on the seabed. The mounting frame 46 is fixedly installed on the seabed, accommodates the energy capturing member 50 therein, and has a corresponding size and shape so that the energy capturing member 50 can be moved therein according to the movement of the seawater. The energy capturing member 50 is disposed inside the mounting frame 46, and one ends of traction wires 41 are connected to an upper end of the energy capturing member 50 and connected to the front boom 31 after passing through the frame pulley 45 and the fixed pulley 44.

In the wave energy capturing system of the ninth embodiment, an energy capturing member 53 having a long horizontal length may be applied, and a T-shaped boom 35 may be applied as a front boom 31 as in the seventh embodiment or one pair of wave energy capturing systems may be applied as in the eighth embodiment. Since the energy capturing member 50 is disposed inside the mounting frame 46 fixed to the seabed, it is possible to prevent the energy capturing member 50 from being lost or damaged in an emergency such as a typhoon.

In the ninth embodiment, the wave energy capturing system includes a supporter frame 10 fixed on the ground, a lever boom 30 coupled to the supporter frame 10 by a pivot, an energy capturing member 50 that captures energy on the waves, a connecting member 40 that connects the lever boom 30 to the energy capturing member 50, and an energy conversion member 70.

FIGS. 11 to 14 are diagrams for describing energy capturing members of wave energy capturing systems according to embodiments of the present invention. An energy capturing member 50 is connected to a lever boom 30 through a traction wire 41 to generate a suction force, potential energy, and an inertia force with the flow of waves and efficiently capture energy.

Figure 11:
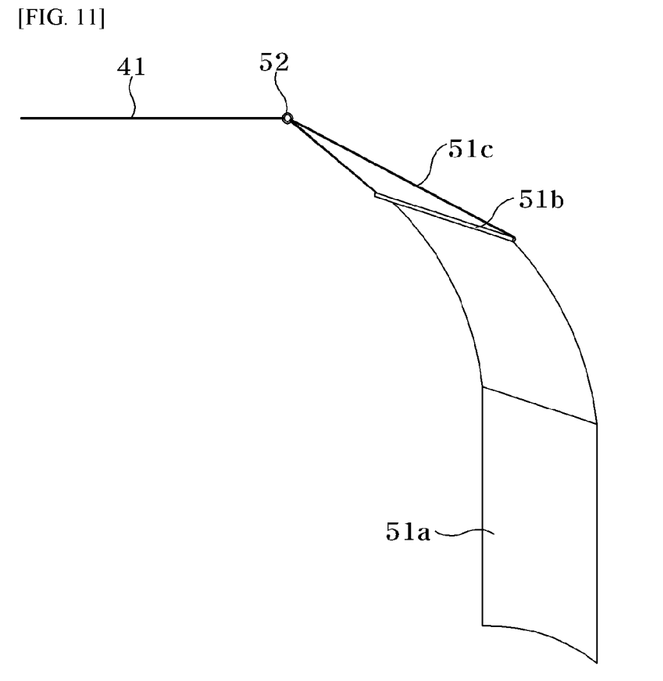
FIGS. 11 to 14 are diagrams for describing energy capturing members of wave energy capturing systems according to embodiments of the present invention.

FIG. 11 illustrates an energy capturing member in the form of a diaphragm 51. The diaphragm 51 blocks a horizontal flow of waves to generate hydrodynamic pressure and drive an energy conversion member 70. In the horizontal flow of waves, the waves generated in the ocean move up and down and propagate to the shore, and then the waves break on the topographical features of the shore or the countercurrent flowing in the direction of the sea at the bottom of the shore, and the waves are high and low tides flowing horizontally rapidly in areas such as a beach with a sloping sea bed, a rock with a sloping surface, or between rocks. The diaphragm 51 is formed in a structure of a wide plate 51a as illustrated. A lower portion of the plate 51a is fixed on the seabed, a membrane frame 51b is coupled to an upper end of the plate 51a, and a traction wire 41 is directly connected to the membrane frame 51b or is connected to the membrane frame 51b through a connecting wire 51c. The diaphragm 51 is connected to the traction wire 41 and the front boom 31. The diaphragm 51 may be made of a solid plate or stainless-steel sheet manufactured by rolling, and in particular, the diaphragm 51 may be provided with a combination of one or more of a metal net formed of a flexible material, a mesh, and highly durable fabrics or flexible polymer sheets. When a surface of the diaphragm 51 is rough or has an uneven structure, energy can be efficiently captured.

Figure 12:
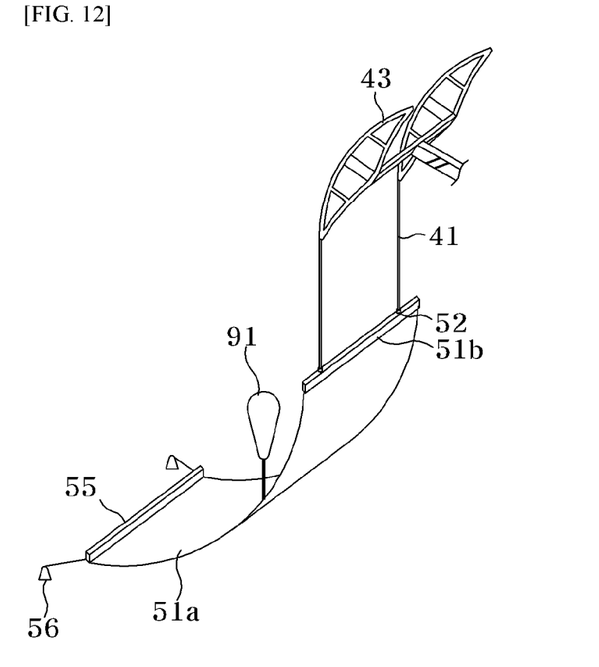

FIG. 12 illustrates a diaphragm 51 according to another embodiment. As illustrated in FIG. 12, when a large diaphragm 51 is applied, membrane frames 51b and 55 are provided on an upper end and a lower end of the diaphragm 51, respectively, a traction wire may be coupled to an upper membrane frame 51b, and a lower membrane frame 55 may be fixed to the seabed through a fixing member 56. In addition, it is possible to maintain an optimal posture by attaching a buoy 91 to the diaphragm 51.

Figure 13:
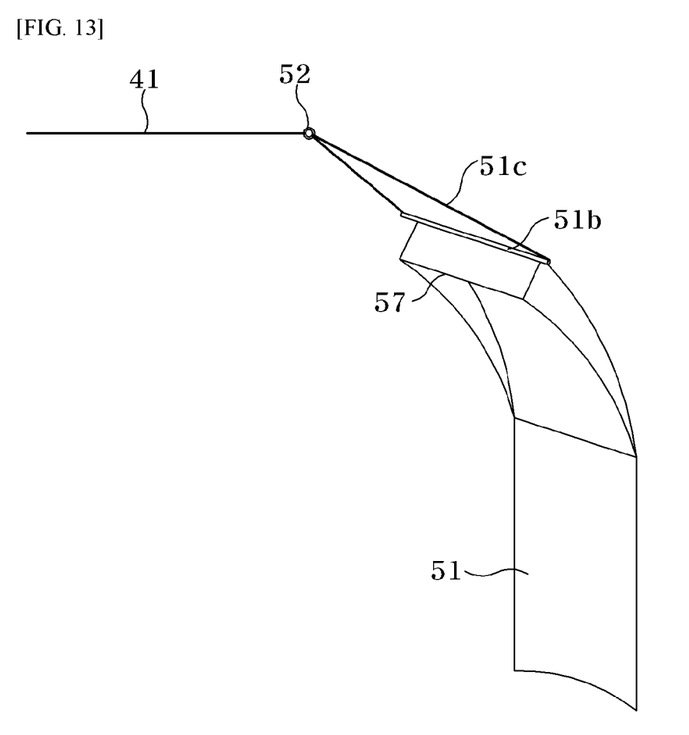

FIG. 13 is a diagram illustrating a diaphragm type energy capturing member 50 according to another embodiment. As illustrated in FIG. 13, the energy capturing member 50 further includes a hopper unit 57 coupled to an upper end of a diaphragm 51.

Figure 14:
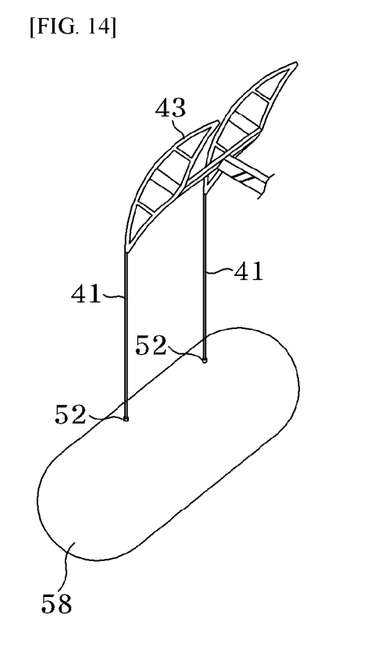

FIG. 14 illustrates a hollow tank energy capturing member 58. The hollow tank energy capturing member 58 has a hollow tank therein and an inside of the hollow tank energy capturing member 58 is filled with a material having a specific gravity of 1.0 or more so that an apparent specific gravity of the hollow tank energy capturing member 58 is set to 1.025 or more and a body of the hollow tank energy capturing member 58 is submerged in water, and an upper portion of the hollow tank energy capturing member 58 is pulled by a traction wire 41 through a bracket and is positioned at a wave crest A. When sea level moves downward, a water level difference is generated between the hollow tank energy capturing member 58 positioned on the wave crest A and sea level. In this case, potential energy due to gravity is generated in the hollow tank energy capturing member 58 so that the hollow tank energy capturing member 58 is moved in the seabed direction, and the hollow tank energy capturing member 58 pulls the traction wire 41 and a front boom 31. When the lowering of the seawater by the waves stops, the hollow tank energy capturing member 58 pulls the front boom 31 through the traction wire 41 using an added inertia force, and a lever boom 30 drives an energy conversion member 70 by increasing a traction force in a ratio of the lengths of the front boom 31 and the rear boom 32. When sea level rises due to the flow of waves, a movement in which the wave hollow tank energy capturing member 58 rises to the wave crest A by the rising flow force of the wave, the buoyancy force, and the traction force of the counterweight is repeated. When the energy capturing member 50 is configured in a large size and a weight thereof becomes heavy, a position control member 80 should be provided proportionally and heavily in order to position the energy capturing member 50 on the wave crest A, and since a weight load is caused on the lever boom 30 due to the weight of the position control member, an air chamber may be provided by forming a hollow tank in the energy capturing member 58 as illustrated in FIG. 14, and thus the weight of the position control member 80 may be reduced.

As described above, the present invention relates to a method in which an energy capturing member 50 is pulled to be positioned on a wave crest, and it can be seen that the present invention has a technical idea in which a lever boom 30 is pulled through a traction wire by generating a suction force, potential energy, an inertia force, and hydraulic pressure with the flow of waves by the flow of sea level, and the lever boom 30 drives an energy conversion member 70 after amplifying a traction force, that is, energy, with a leverage effect to generate power.

Therefore, it should not be limited by the above-described embodiments of the present invention and the accompanying drawings, but should be limited by the technical spirit of the present invention and the appended claims.

The invention claimed is:

1. A wave energy capturing system comprising:
a supporter frame fixed on a ground or at sea;
a lever boom coupled to the supporter frame by a pivot;
an energy capturing member connected to one end of the lever boom to capture wave energy from the sea;
a position control member connected to the other end of the lever boom to control a position of the lever boom so that the lever boom returns to a set position in response to an external traction force; and
an energy conversion member connected to the lever boom to convert movement of the lever boom into power,
wherein the lever boom includes a front boom at a side connected to the energy capturing member and a rear boom at a side connected to the energy conversion member with respect to the pivot, and is formed to have a leverage structure in which a length of the front boom is greater than a length of the rear boom, and
the position control member is an elastic body connecting an end portion of the rear boom to a bottom fixture,
wherein the energy capturing member is a planar diaphragm that is connected to the one end of the lever boom and blocks a flow of the waves, and
the diaphragm has an end portion at a sea side fixed to the seabed and an end portion at another side to which a membrane frame is coupled, wherein the membrane frame is connected to an end portion of the front boom through a traction wire.

2. The wave energy capturing system of claim 1, further comprising a hopper unit coupled to an upper end of the diaphragm.

3. The wave energy capturing system of claim 1, wherein a mast is coupled to an upper portion of the lever boom to be perpendicular to the lever boom, and an upper end of the mast is connected to each of an end portion of the front boom and the end portion of the rear boom through a tension dispersing wire.

4. The wave energy capturing system of claim 1, wherein the energy conversion member includes a power conversion drum connected to the rear boom through a driving wire.

5. The wave energy capturing system of claim 1, further comprising a winch installed on an end portion of the front boom,
wherein the energy capturing member is connected to the front boom through a traction wire whose length is adjusted by the winch.

* * * * *